(12) United States Patent
Czimmek et al.

(10) Patent No.: US 8,443,829 B2
(45) Date of Patent: May 21, 2013

(54) LIFT LOCK ASSEMBLY FEATURE FOR AIR BYPASS VALVE

(75) Inventors: Perry Robert Czimmek, Williamsburg, VA (US); Michael J. Hornby, Williamsburg, VA (US)

(73) Assignee: Continental Automotive Systems US, Inc., Auburn Hills, MI (US)

( * ) Notice: Subject to any disclaimer, the term of this patent is extended or adjusted under 35 U.S.C. 154(b) by 279 days.

(21) Appl. No.: 12/812,607

(22) PCT Filed: Feb. 17, 2009

(86) PCT No.: PCT/US2009/034233
§ 371 (c)(1),
(2), (4) Date: Jul. 13, 2010

(87) PCT Pub. No.: WO2009/105405
PCT Pub. Date: Aug. 27, 2009

(65) Prior Publication Data
US 2010/0288954 A1    Nov. 18, 2010

Related U.S. Application Data

(60) Provisional application No. 61/066,348, filed on Feb. 19, 2008.

(51) Int. Cl.
*F16K 43/00* (2006.01)
*F16K 31/00* (2006.01)
*F16K 31/02* (2006.01)

(52) U.S. Cl.
USPC .................. 137/316; 137/315.03; 251/129.15

(58) Field of Classification Search
USPC   251/129.07, 129.15, 129.17, 129.2; 137/316, 137/315.03, 625.65; 123/568.26; 335/253, 335/270, 262, 271, 272
See application file for complete search history.

(56) References Cited

U.S. PATENT DOCUMENTS 5,146,196 A * 9/1992 Frank ........................... 335/271
5,685,519 A * 11/1997 Bircann et al. ........... 251/129.15

(Continued)

FOREIGN PATENT DOCUMENTS

GB    2338050 A    12/1999
WO    2007048828 A    5/2007

(Continued)

OTHER PUBLICATIONS

PCT International Preliminary Report on Patentability in PCT/US2009/034233.

(Continued)

*Primary Examiner* — John K Fristoe, Jr.
*Assistant Examiner* — Daphne M Barry (57) ABSTRACT

A solenoid device includes a solenoid assembly (30) including a stator (42, 32, 38), a coil (36) for generating a magnetic field, and first retention structure (64). Armature and seal assembly includes armature structure (14, 16) that moves with respect to the solenoid assembly from a closed position to an open position in response to the magnetic field generated by the coil, seal structure (22) that is coupled with a proximal end of the armature structure and has a sealing edge (28) to seal with a component when the armature structure is in the closed position thereof, and second retention structure (68). A spring (44) biases the armature structure to the closed position. The first and second retention structures engage and retain the armature and seal assembly with respect to the stafor assembly prior to installation of the device.

19 Claims, 5 Drawing Sheets

U.S. PATENT DOCUMENTS

| | | | |
|---|---|---|---|
| 5,757,259 A * | 5/1998 | Fulford et al. | 336/92 |
| 5,947,092 A * | 9/1999 | Hussey et al. | 123/568.26 |
| 6,295,975 B1 * | 10/2001 | Yew et al. | 123/568.2 |
| 6,453,667 B1 * | 9/2002 | Everingham | 60/289 |

FOREIGN PATENT DOCUMENTS

| | | | |
|---|---|---|---|
| WO | 2007088043 A | 8/2007 | |
| WO | 2009108531 A1 | 9/2009 | |
| WO | 2009108532 A1 | 9/2009 | |
| WO | 2009108533 A1 | 11/2009 | |

OTHER PUBLICATIONS

Written Opinion In PCT International Application No. PCT/US2009/034233 dated May 28, 2009.

Search Report In PCT International Application No. PCT/US2009/034233 dated May 28, 2009.

* cited by examiner

LIFT LOCK ASSEMBLY FEATURE FOR AIR BYPASS VALVE

This application is based on U.S. Provisional Application No. 61/066,348 filed on Feb. 19, 2008, claims the benefit thereof for priority purposes, and is hereby incorporated by reference into this specification.

FIELD

The embodiment relates to a solenoid device for the bypass of intake air in an automotive application and, more particularly, to an air bypass valve that allows for retention of moving parts during assembly, shipping and final handling prior to installation.

BACKGROUND

Automotive applications typically using an air pump, specifically a turbine, supercharger, or exhaust driven turbocharger, include gasoline, natural gas or diesel internal combustion engines. Other automotive applications also include fuel cells and fuel reformers, both requiring large volumes of air and often supplied by a turbine pump. While a bypass valve may be utilized for any pump configuration, the exhaust driven turbocharger is the typical application. The exhaust driven turbocharger is a free-spinning turbine with a shaft-separated split impeller, one end receiving force and a rotational moment from the exiting exhaust gases, the other end applying a pumping effect. As it is a free-spinning turbine, if the load on the air side suddenly increases due to a sudden decrease of demand by the engine, such as during deceleration, the pump will see a dramatic decrease in rotation and the corresponding sudden decrease in cooling effect, lubricating effect, as well as a high fatigue load on the impeller blades.

For the purpose of reducing the load on the turbocharger during sudden decreases of downstream flow, a bypass valve is typically applied to allow the impeller to continue moving air from the low pressure side to the high pressure side at a rate now set by the impeller speed. It is desirable to have a valve which can respond quickly when deceleration, load change or load shift point occurs, and recover quickly as when acceleration or higher load is suddenly required. When not energized, it is desirable to minimize bypass leak and corresponding decrease in pump efficiency when full throughput is required from pump. This must be satisfied with robustness as well as cost efficiency, while at the same time not introducing undesirable noise, vibration and harshness, or noise, vibration, harshness (NVH). In a cost efficient configuration, the handling characteristics must not be sacrificed and it is desirable to have a feature that retains all the stationary and moving components as an assembly, without adding to the overall size of the device, nor adding cost. Retention prevents the moving parts from separating from the device during assembly, shipping and handling, and the subsequent possible damage and loss of critical functional parts.

Thus, there is a need to provide an improved air bypass valve that includes retention structure for retaining moving parts prior to installation of the valve.

SUMMARY

An object of the present invention is to fulfill the need referred to above. In accordance with the principles of an embodiment, this objective is obtained by providing a solenoid device including a solenoid assembly having a stator, a coil constructed and arranged to be energized to generate a magnetic field, and first retention structure. An armature and seal assembly includes an armature structure constructed and arranged to move with respect to the solenoid assembly during operation from a closed position to an open position in response to the magnetic field generated by the coil and a seal structure coupled with armature structure The seal structure having a sealing edge constructed and arranged to seal with a component when the armature structure is in the closed position thereof. The armature and seal assembly also includes second retention structure associated with the first retention structure. A spring biases the armature structure to the closed position. The first and second retention structures are constructed and arranged to engage and retain the armature and seal assembly with respect to the stator assembly prior to installation of the device.

In accordance with another aspect of the embodiment, a method of a method of locking movable parts of a solenoid device prior to installation of the device provides a solenoid assembly including a stator and a coil constructed and arranged to be energized to generate a magnetic field. An armature and seal assembly is provided and includes an armature structure constructed and arranged to move with respect to the solenoid assembly from a closed position to an open position in response to the magnetic field generated by the coil, and a seal structure coupled with the armature structure. The seal structure has a sealing edge constructed and arranged to seal with a component when the armature structure is in the closed position thereof. The armature structure is biased to the closed position. The method ensures that prior to installation of the device, the armature and seal assembly is engaged with to the solenoid assembly thereby preventing movement of the armature and seal assembly with respect to the solenoid assembly.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF AN EXAMPLE EMBODIMENT

Figure 1:
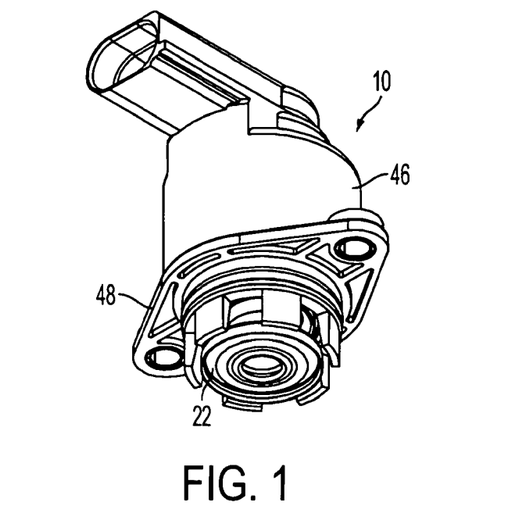
FIG. 1 is a view of a solenoid device in the form of an automotive air bypass valve in accordance with an embodiment of the present invention.

Referring to FIG. 1, a solenoid device in the form of an air bypass valve for a vehicle is shown, generally indicated at 10, in accordance with an embodiment of the invention. The air bypass valve detailed herein comprises about fourteen basic parts, potentially none of which are machined, but all of which are preferably injection molded, stamped, or drawn from sheet stock. Such a configuration provides a realized savings in used material volume and type, along with the corresponding environmental and economic benefits.

Figure 2:
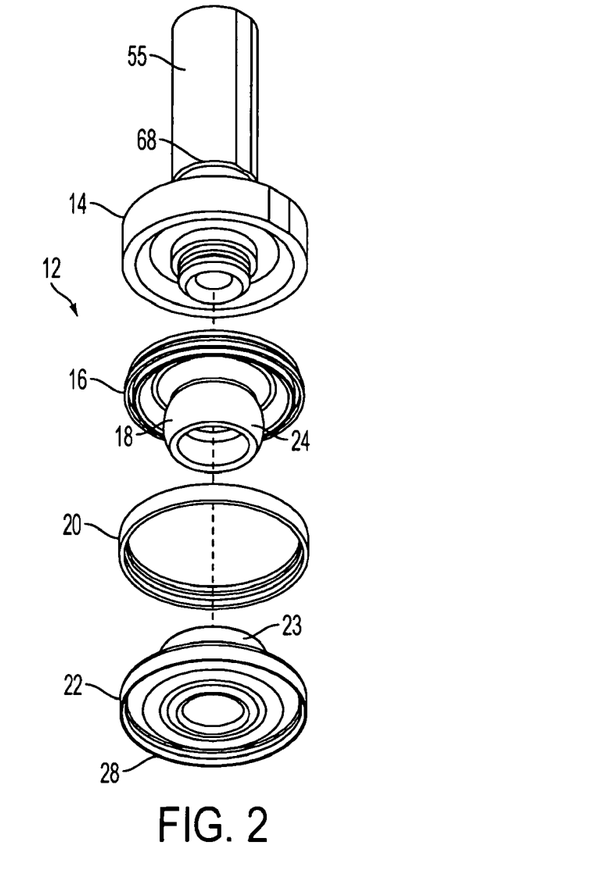
FIG. 2 is an exploded view of an armature and seal assembly of the air bypass valve of FIG. 1.
Figure 3:
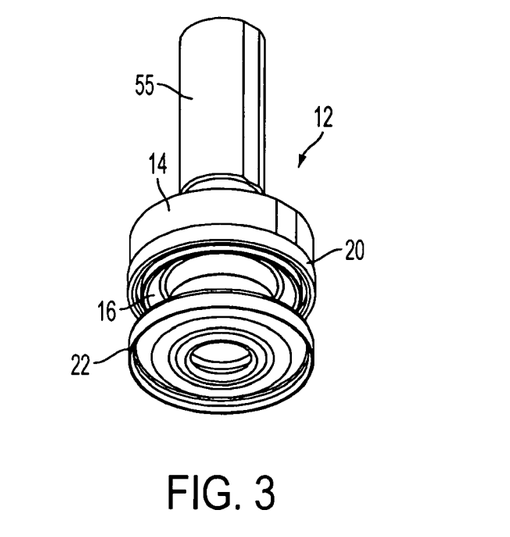
FIG. 3 is an assembled view of the armature and seal assembly of FIG. 2.
Figure 7:
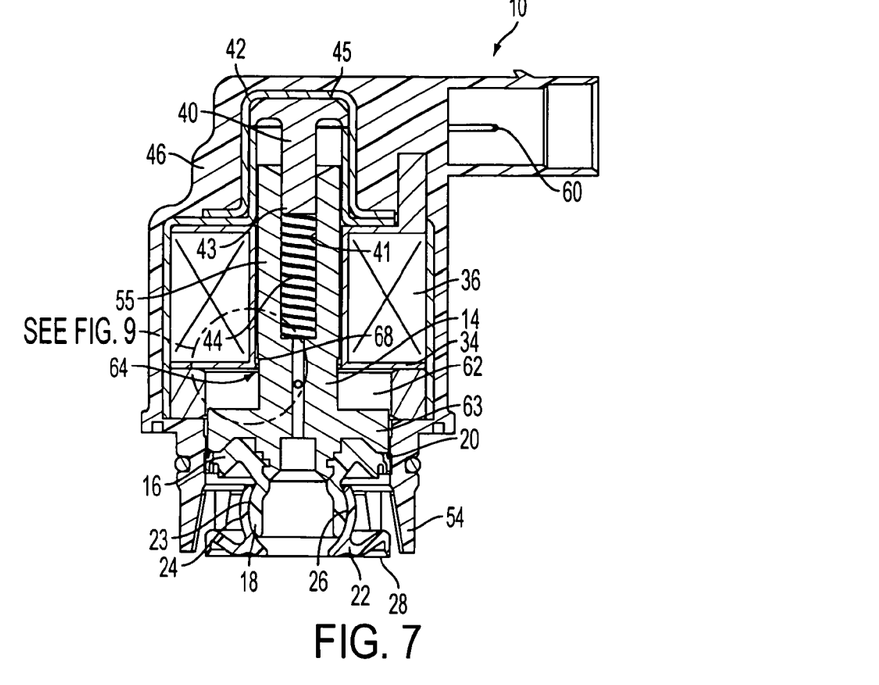
FIG. 7 is a sectional view of a solenoid device of FIG. 1 shown with an armature in a closed position.

With reference to FIGS. 2, 3, and 7, an armature and seal assembly is shown, generally indicated at 12. The armature and seal assembly 12 is the moving component of the valve 10 and includes an armature structure having an armature 14 and a composite, resin or polymer molded pivot gland structure 16 either molded onto a proximal end 15 of the armature 14 or assembled thereto with a mechanical retainer (not shown). Thus, the gland structure 16 can be considered to be part of the armature 14 and includes a gland member 18, the function of which will be explained below. A dynamic seal 20 of an appropriate material is either incorporated as part of the gland structure 16, co-injection molded therewith, or coupled thereto as a separate component. The dynamic seal 20 reduces air leakage past the armature 14, reducing both air noise and bypass leakage. Finally, a hard seal structure 22, preferably made of similar materials as the gland structure 16, has a pivot member 23 that is preferably snapped together with the gland member 18. As best shown in FIG. 7, the mating co-centric spherical surfaces (external surface 24 of gland member 18 and internal surface 26 of the pivot member 23) form a pivot function such that the seal structure 22 can rotate with respect to the gland structure 16 and thus the armature 14. The 360° pivot function is accommodates any dimensional variance from ideal between the axis of the solenoid assembly 30, mounting face of the complete assembly and the sealing surface and mounting surfaces of the respective air manifold or component to which the valve assembly 10 is attached. By accommodating these variances, bypass leak is minimized and durable function of the solenoid maximized in allowing the hard sealing edge 28 of the hard seal structure 22 to mate with the opposite mounting sealing surface as parallel as possible. It is noted that the inner spherical surface can be part of the gland member with the outer spherical surface being part of the pivot member 23.

Figure 4:
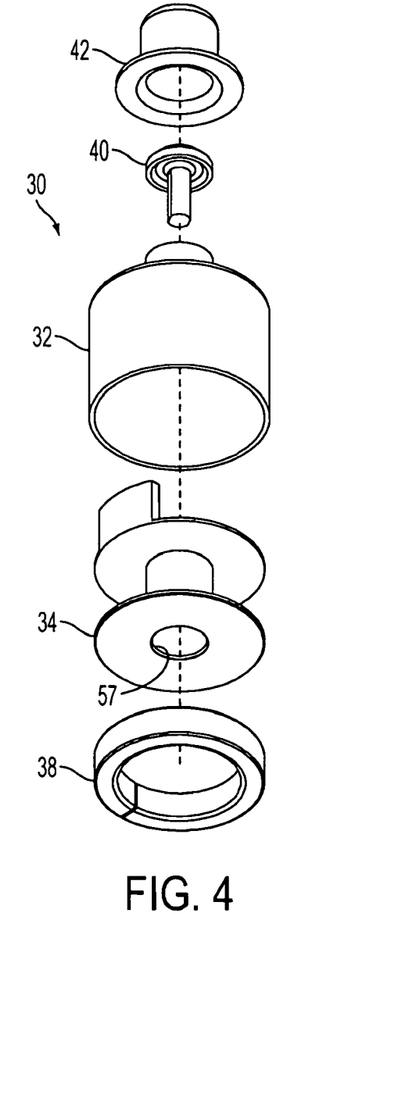
FIG. 4 is an exploded view of a solenoid assembly of the air bypass valve of FIG. 1.
Figure 5:
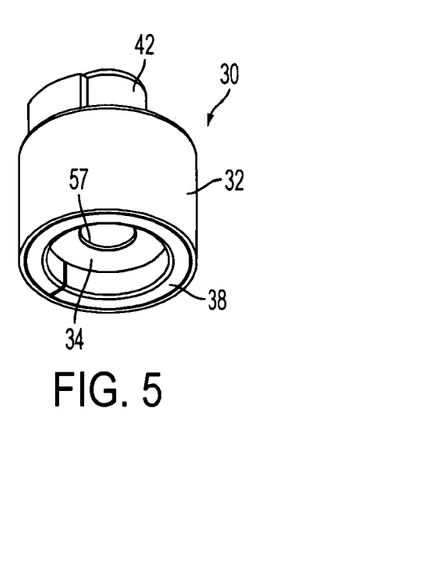
FIG. 5 is an assembled view of the solenoid assembly of FIG. 4.
Figure 8:
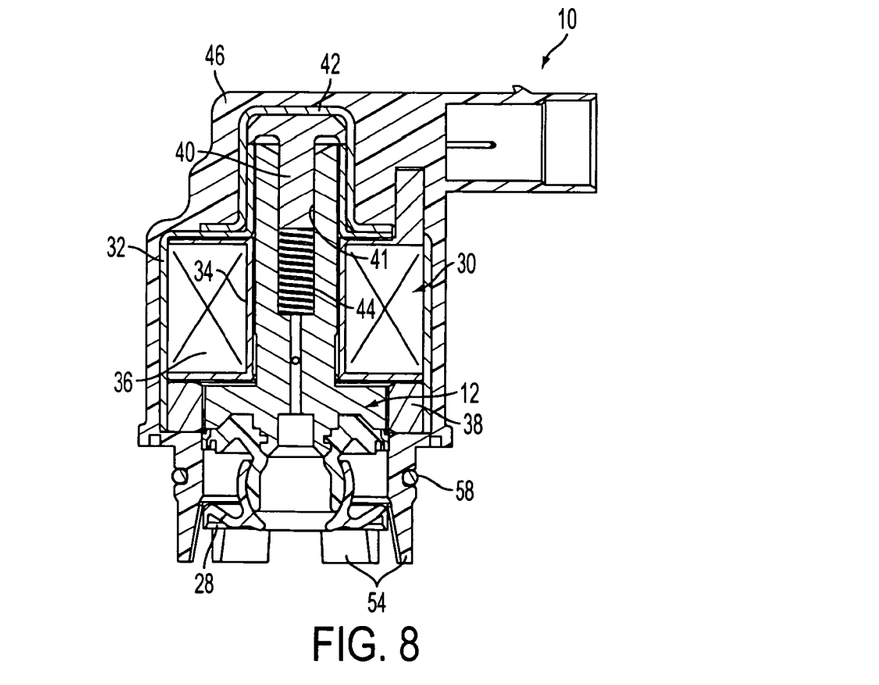
FIG. 8 is a view of the solenoid device of FIG. 7, with the armature shown in an open position.

With reference to FIGS. 4, 5, and 8, solenoid assembly, generally indicated at 30, is shown. The solenoid assembly 30 includes the stationary magnetic components of the valve 10 and includes a magnetic (e.g., ferrous) housing 32 that provides a flux return path and a datum enclosure for other parts of the valve 10. A coil bobbin 34 is wound with an electromagnet coil 36 of a suitable wire material of an appropriate number of turns to provide the resistance and ampere-turns necessary for proper function with the available control electronics. The coil 36 is not shown in FIG. 4. The coil bobbin 34 with coil 36 is inserted into the housing 32, and a magnetic (e.g., ferrous) flux ring 38 is pressed into the housing 32, retaining the coil bobbin 34 and providing a specific working magnetic pole-type to the armature 14. A spring pin 40 is provided in the housing 32 and a magnetic (e.g., ferrous) end cap 42 is pressed onto the housing 32, thereby retaining the spring pin 40. As shown in FIG. 7, upon assembly, the spring pin 40 is received in a bore 41 in a stem portion 55 of the armature 14 so that a first end 43 of the spring pin 40 engages the spring 44 and a second end 45 of the spring pin 40 is adjacent to the end cap 42. The spring pin 40 provides an axial flux path into the armature 14 as well as guides a closing return spring 44, also in bore 41, in the final assembly. The stator of the solenoid assembly 30 comprises the lump magnetic circuit formed by the magnetic flux ring 38, the magnetic housing 32, the magnetic end cap 42 and, if desired, the spring pin 40.

Figure 6:
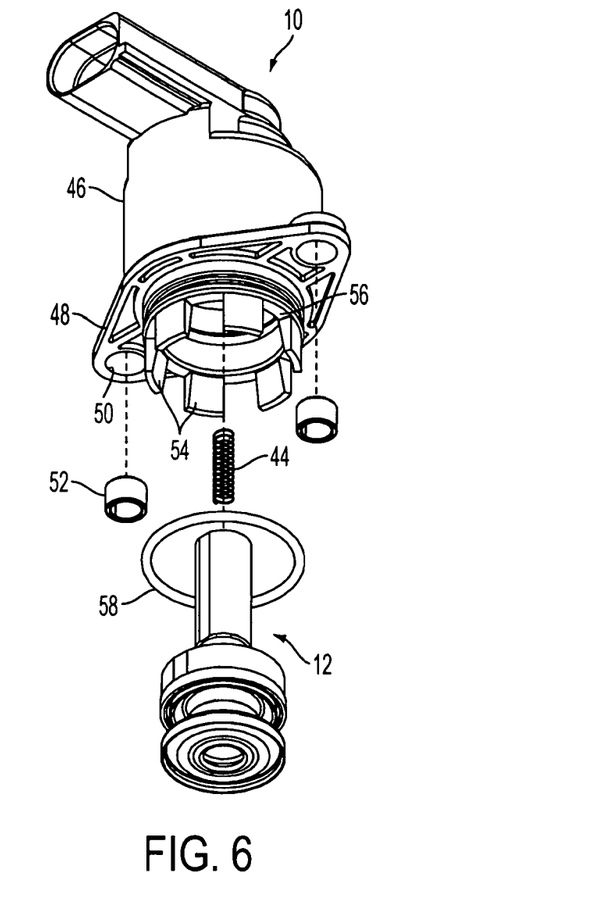
FIG. 6 is an exploded view of the armature assembly being inserted into the overmolded solenoid assembly of the air bypass valve of FIG. 1.

With reference to FIG. 6, the solenoid assembly 30 is over-molded with an appropriate polymer or resin to provide the final encapsulation and retention main housing 46 of all stationary parts for the air bypass valve 10. FIG. 6 shows the final assembly of the valve 10 and also shows how the encapsulation provides a customer specified flange 48 for mounting by the end user. Preferably the flange 48 includes mounting holes 50 that receive, preferably in an encapsulated manner, a support boss 52 therein. In addition, the main housing 46 includes impact protection structure that protect the armature and seal assembly 12 from drops and handling, as well as any manifold sealing O-rings. In the embodiment, the impact protection structure includes a plurality of tabs 54 extending in an annular manner from a bottom surface 56 of the housing 46 so as to generally surround the seal structure 22 of the armature and seal assembly 12.

In the final assembly steps, the closing return spring 44 is inserted into the armature 14, and the armature and seal assembly 12 is the inserted into the solenoid assembly 30. More particularly, a stem portion 55 of the armature 14 is received in a bore 57 in the coil bobbin 34. An O-ring 58 provides a seal with respect to an air manifold (not shown) to which the valve 10 is attached.

Basic operation of the valve 10 will be appreciated with reference to FIGS. 7 and 8. FIG. 7 shows the closed position the valve 10 and armature 14 (biased by spring 44) when the electromagnetic coil 36 is not energized via leads 60. In this position, the magnetic gap working volume area 62 is clearly shown between the bobbin 34 and a generally cylindrical base 63 of the armature 14. The sealing edge 28 is an extended position so as to engage with the manifold surface (not shown). FIG. 8 shows the open position of the valve 10 and armature 14 when voltage is applied to the coil 36 such that a force on the armature 14 overcomes the force of spring 44. In this position, the sealing edge 28 is a retracted position so as to disengage with the manifold surface (not shown).

Figure 9:
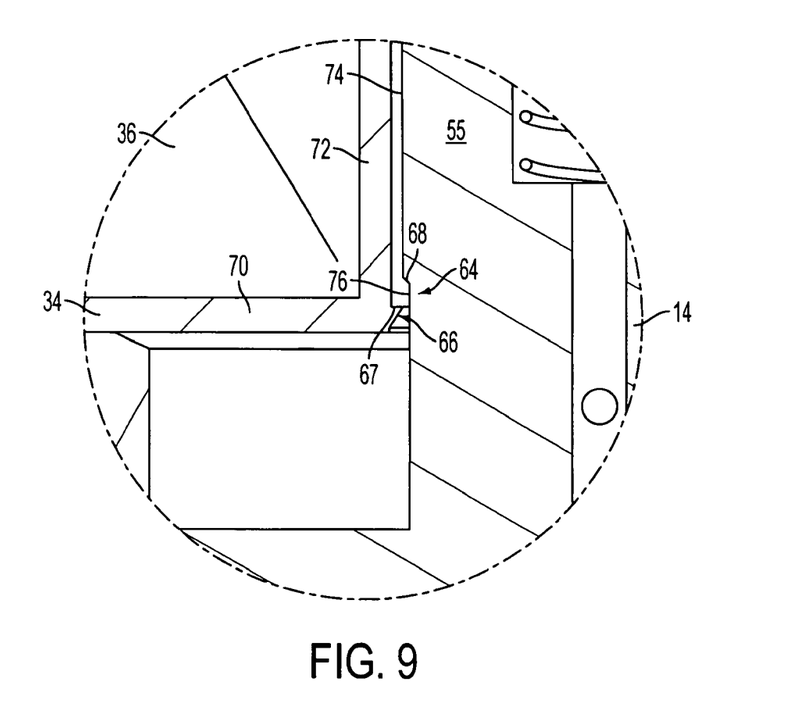
FIG. 9 is an enlarged view of the portion encircled by 9 in FIG. 7.

With reference to FIG. 9, an example embodiment of the lift-lock structure, generally indicated at 64. The lift lock structure 64 includes a first retention structure, generally indicated at 66, preferably molded into the coil bobbin 34 and an associated, second retention structure 68 is defined in the stem portion 55 of the armature 14. More particularly the first retention structure 66 includes a step, shoulder, protruding corner, catch or diametrical burr molded on the bobbin 34. An annular shoulder 67 is shown that extends outwardly from a base 70 into the bobbin bore 57 and beyond an extent of a spool portion 72 of the coil bobbin 34. The second retention structure 68 defines an annular step in the periphery of the stem portion 55 of the armature 14 that tapers a large diameter portion 74 of the stem portion 55 to a smaller diameter portion 76. The large diameter portion 74 engages and interferes with the protruding shoulder 67 on the bobbin 34, but only during assembly of the device, prior to installation. The shoulder 67 preferably elastically deforms (as it is plastic or polymer) during assembly, upon pushing the armature large diameter portion 74 across the shoulder 67 to the step 68. The engaged shoulder 67 prevents the armature and seal assembly 12 from falling out of the bobbin 34 and thus, out of the valve 10. The lift lock feature is only for assembly and retaining the armature and seal assembly 12 during shipping and final handling of the valve 10 until it is installed in the application, where the travel of the armature assembly is ultimately limited by the sealing surface and mounting surface distance. It can be appreciated that the retention structures 66, 68 can have may different configurations for temporarily securing the armature and seal structure 12 with respect to the solenoid assembly 30. For example, the shoulder 67 need not deform but can have a notch that engages with the step 68.

During operation of the valve 10, neither structure 66, 68 contacts the other as the location of the engaging features is selected to be outside the operating stroke range of the bypass valve. In particular, the smaller diameter portion 76 of the armature 14 clears the inner diameter of the shoulder 68 such that the stroke is not impeded during normal operation of the valve 10. Thus, there is no need to disengage the parts since the lift in operation is less than the lift limit of the locked parts, so the parts are free to move over the operation lift, which never reaches the limit set by the lift-lock structure.

Thus, the valve 10 is an electronically activated electromagnetic valve whose purpose is to bypass working air from the high pressure side to the low pressure side of a manifold pressure boost pump, turbocharger, supercharger, turbine air pump or similar. The air bypass valve 10 utilizes retention structures that allow for the retention of moving parts during assembly, shipping and final handling prior to installation that adds to the robustness of the valve 10. The retention structures for the air bypass valve 10 consists of no additional parts, but are preferably molded or cast, or are single-step machined features in existing parts. This is a realized savings in used process time, material and parts count, and the corresponding environmental and economic benefit. It can be appreciated that the retention structures can be located to create retention on any diametrical surface of the relative moving and stationary parts.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A solenoid device comprising:
   a solenoid assembly comprising:
      a stator,
      a coil constructed and arranged to be energized to generate a magnetic field, the coil including and
      first retention structure,
   an armature and seal assembly comprising:
      an armature structure constructed and arranged to move with respect to the solenoid assembly during operation from a closed position to an open position in response to the magnetic field generated by the coil,
      a seal structure coupled with armature structure, the seal structure having a sealing edge constructed and arranged to seal with a component when the armature structure is in the closed position thereof, and
      second retention structure associated with the first retention structure, and
   a spring biasing the armature structure to the closed position,
   wherein the first and second retention structures are constructed and arranged to engage and retain the armature and seal assembly with respect to the stator assembly prior to installation of the device, and during both an upward and a downward operating stroke of the armature, the first and second retention structures are constructed and arranged so as not to engage each other.

2. The device of claim 1, wherein the first and second retention structures are located outside an operating stroke range of the device.

3. The device of claim 1, wherein the armature structure includes an armature having a base and a generally rod-shaped stem portion extending from the base, and wherein the coil is disposed about a bobbin that is received in an interior portion of a magnetic housing of the stator, the bobbin having a bore there-through, the stem portion of the armature being received in the bore.

4. The device of claim 3, wherein the first retention structure includes an annular shoulder in a portion of the bobbin that extends into the bore, and the second retention structure includes an annular step in the periphery of the stem portion of the armature defining a first diameter portion and a second, larger diameter portion, with the second diameter portion being constructed and arranged to engage with the shoulder to retain armature and seal assembly with respect to the stator assembly, and with an inside diameter of the shoulder clearing the first diameter portion in an operating stroke range of the device.

5. The device of claim 4, wherein the larger diameter portion deforms the shoulder to cause engagement therewith.

6. The device of claim 3, wherein the spring is disposed in a bore in the stem portion of the armature.

7. The device of claim 6, further comprising a spring pin having a first end engaging an end of the spring, and a magnetic end cap adjacent to a second end of the spring pin such that the spring pin provides an axial flux path into the armature and guides the spring.

8. The device of claim 1, wherein the device is an air bypass valve for a vehicle, wherein the seal structure is coupled with armature structure so that the seal structure can pivot with respect to the armature structure, the seal structure having a sealing edge constructed and arranged to seal with a component when the armature structure is in the closed position thereof.

9. The device of claim 8, wherein the armature structure includes an armature and a gland structure coupled thereto, the gland structure having a gland member defining a generally spherical surface, and the seal structure has a pivot member defining a generally spherical surface that is engaged with the generally spherical surface of the gland member permitting rotating of the seal structure with respect to the armature.

10. The device of claim 9, further comprising a dynamic seal associated with the gland structure, the dynamic seal being constructed and arranged to reduce air leakage past the armature.

11. The device of claim 2, further comprising a main housing defining a plastic overmold covering the magnetic housing.

12. The device of claim 11, wherein the main housing includes impact protection structure constructed and arranged to protect seal structure.

13. The device of claim 12, wherein the impact protection structure includes a plurality of tabs extending in an annular manner from an end of the main housing so as to generally surround the seal structure.

14. A method of locking movable parts of a solenoid device prior to installation of the device, the method comprising:
   providing a solenoid assembly including a stator and a coil constructed and arranged to be energized to generate a magnetic field, providing and armature and seal assembly comprising:
- an armature structure constructed and arranged to move with respect to the solenoid assembly from a closed position to an open position in response to the magnetic field generated by the coil, and
- a seal structure coupled with the armature structure, the seal structure having a sealing edge constructed and arranged to seal with a component when the armature structure is in the closed position thereof, biasing the armature structure to the closed position, ensuring that prior to installation of the device, the armature and seal assembly is engaged with to the solenoid assembly thereby preventing movement of the armature and seal assembly with respect to the solenoid assembly, and ensuring that during both an upward and a downward operating stroke of the armature, the first and second retention structures do not engage each other.

15. The method of claim 14, wherein the step of providing the armature structure includes providing an armature having a base and a generally rod-shaped stem portion extending from the base, and wherein the coil is disposed about a bobbin that is received in an interior portion of a magnetic housing of the stator, the bobbin having a bore there-through, the stem portion of the armature being received in the bore.

16. The method of claim 15, wherein the step of ensuring engagement of the armature and seal assembly includes ensuring that first retention structure defined on the bobbin is engaged with second retention structure defined on the stem portion of the armature.

17. The method of claim 16, wherein the first retention structure defines an annular shoulder and the second retention structure defines an annular step in a periphery of the stem portion of the armature that defines a first diameter portion and a second, larger diameter portion, with the second, larger diameter portion engaging with the shoulder to retain armature and seal assembly with respect to the stator assembly.

18. The method of claim 17, wherein the step of ensuring that the first and second retention structures do not engage each other ensures that the armature and seal assembly is free to move after installation of the device with respect to the component by ensuring that an inside diameter of the shoulder clears the first diameter portion in an operating stroke range of the device.

19. The method of claim 14, wherein the device is an air bypass valve for a vehicle and the component is a manifold.

* * * * *